P. G. NICHOLS & A. E. ANDERSON.
Thrashing-Machines.
No. 156,940.                                   Patented Nov. 17, 1874.
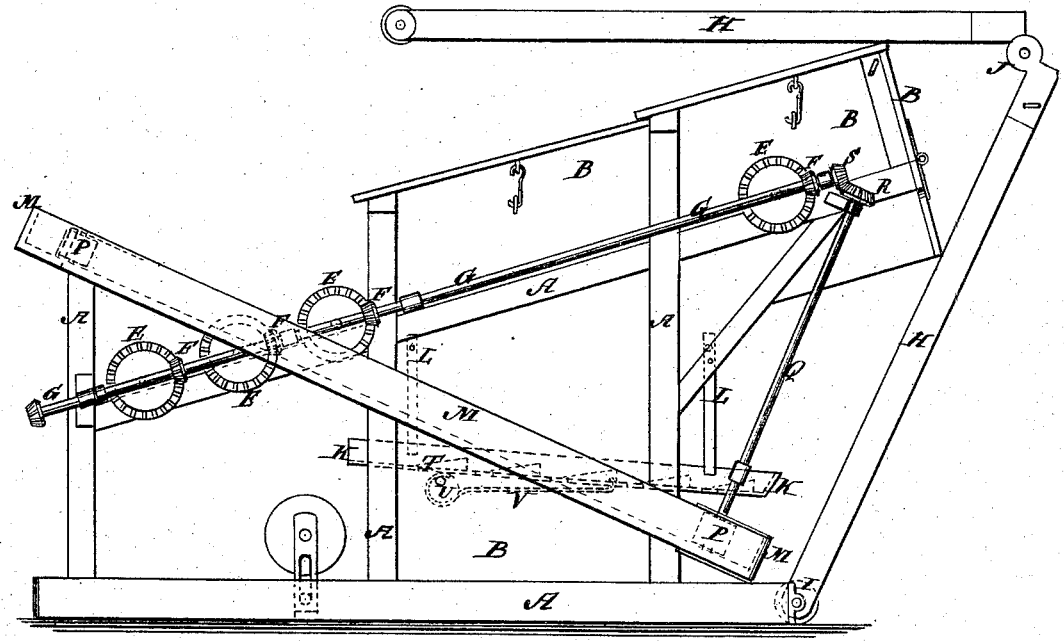
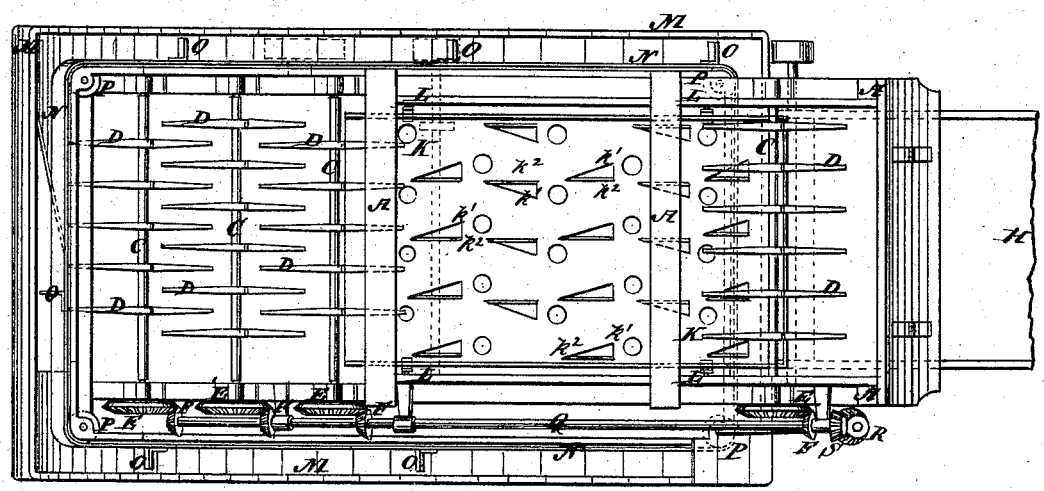
WITNESSES:                                   INVENTOR:
E. Wolff                                     P. G. Nichols
O. Sedgwick                                  A. E. Anderson
                                         BY
                                             ATTORNEYS.

UNITED STATES PATENT OFFICE.

PERRY G. NICHOLS AND ANDREW E. ANDERSON, OF CRESCO, IOWA.

IMPROVEMENT IN THRASHING-MACHINES.

Specification forming part of Letters Patent No. 156,940, dated November 17, 1874; application filed March 21, 1874.

*To all whom it may concern:*

Be it known that we, PERRY G. NICHOLS and ANDREW E. ANDERSON, of Cresco, in the county of Howard and State of Iowa, have invented a new and useful Improvement in Grain Thrasher, Separator, and Stacker, of which the following is a specification:

Figure 1 is a side view of a part of the machine illustrating our invention, the stacker being shown as folded for transportation. Fig. 2 is a top view of the same, the cover of the machine being removed, and the stacker being broken away.

Similar letters of reference indicate corresponding parts.

The invention will first be fully described, and then pointed out in the claim.

A represents the frame-work of the machine, and B represents the casing. C is a series of parallel horizontal shafts, revolving in bearings in the frame A, and arranged upon a line inclining upward at an angle of about seventeen degrees. The shafts C are made square, or have square collars attached to them, to the four sides of which are attached rows of fingers D, four rows to each shaft, and which are so arranged that the fingers of each shaft may pass through the spaces between the fingers of the adjacent shafts, as shown in Fig. 2. To the projecting ends of the journals of the shafts C are attached bevel-gear wheels E, the teeth of which mesh into the teeth of the small bevel-gear wheels F, attached to the shaft G, which extends longitudinally along the side of the machine, at the same inclination as the row of shafts C revolves in bearings attached to the frame A, and has a gear-wheel attached to its rear end to mesh into a gear-wheel connected with the thrashing-cylinder, which cylinder is not shown in the drawing.

By this construction, as the straw and grain come from the thrasher, they are received upon and carried forward by the fingers D, the shafts of which revolve uniformly, so that the fingers of each succeeding shaft may take the straw from the fingers of the preceding shaft, thoroughly shaking out the grain. As the straw passes from the fingers D it falls upon the stacker H, by which it is deposited upon the stack. The lower end of the stacker-frame H is pivoted to the lower part of the frame A, or to the shaft I, which revolves in bearings attached to said frame A, and by which the endless carrier of the stacker is driven. The carrier is not shown in the drawings. The stacker-frame H is made in two parts, connected to each other by hinges J, as shown in Fig. 1, so that its upper part can be folded back over the frame of the machine for convenience in transporting from place to place.

The machine is furnished with a carrier, which is not shown in the drawings, by which the grain from the thrasher and that shaken out of the straw by the fingers D is deposited upon the upper part of the sieve K, which is suspended by rods L, one near each corner, the upper ends of which are pivoted to the frame A or casing B, so that the said sieve may have a longitudinal but no lateral movement. The sieve K is made of sheet metal, in which are cut openings $k^1$, made in the shape of right-angled triangles, having one of the sides that form the right angle considerably longer than the other, and which are arranged with the said longer side parallel with the length of the sieve. These openings $k^1$ are formed by cutting the hypotenuse and short side, and bending the flap thus formed upward at right angles, thus forming inclined flanges or lips $k^2$, to cause the sieve to clear itself, and thus prevent it from clogging. The sieve K may also have round or other-shaped holes formed in it. The tailings from the sieve K are received in the lower end part of the trough M, which extends entirely around the machine, and the sides of which incline upward, so that the upper end part may be in such a position as to deliver the tailings to the thrasher, to be operated upon by the thrashing-cylinder, and again pass through the machine. The opening in the bottom of the upper end part of the trough M, through which the tailings fall to the thrasher, is made tapering, its narrower end being toward the advancing buckets of the carrier, so that the tailings may be distributed, and not dropped in a heap. N is the endless belt of the carrier, which passes through the trough M, and has buckets O attached to it at suitable distances apart. The carrier N O passes around small rollers P, pivoted in the four corners of the trough M, and to one of which is attached the lower end of a shaft, Q, which revolves in bearings attached to the frame A, and to its upper end is attached a small bevel-gear wheel, R, the teeth of which mesh into the teeth of the small bevel-gear wheel S, attached to the end of the shaft G. T is a shaft, which passes across the machine a little below the upper end of the sieve K, and revolves in bearings attached to the frame-work of the machine. To the shaft T are attached two eccentric wheels, U, around which pass straps formed upon or attached to the ends of the bars V, the other ends of which are attached to the sieve K, so that the said sieve may be oscillated longitudinally by the revolution of the shaft T. The shaft T may be driven from the cylinder or fan-shaft, or by the belt that drives the carrier of the stacker, as may be desired or convenient.

Having thus described our invention, we claim as new, and desire to secure by Letters Patent—

An endless bucketed carrier, N O, combined with a trough, M, extending around frame A in an oblique direction from rear to front, and having an opening at the upper end, as shown and described, to receive and transfer the tailings back to the thrasher.

PERRY G. NICHOLS.
ANDREW E. ANDERSON.

Witnesses:
WM. W. WHITE,
JEREMIAH BARKER.